(12) United States Patent
Mohan Raj et al.

(10) Patent No.: US 12,342,159 B2
(45) Date of Patent: Jun. 24, 2025

(54) METHODS, SYSTEMS, AND COMPUTER READABLE MEDIA FOR PROVIDING SHARED SECURITY EDGE PROTECTION PROXY (SEPP) FOR ROAMING AGGREGATORS

(71) Applicant: Oracle International Corporation, Redwood Shores, CA (US)

(72) Inventors: John Nirmal Mohan Raj, Bangalore (IN); Nikita Satish Nair, Mumbai (IN); Jay Rajput, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 164 days.

(21) Appl. No.: 17/984,287

(22) Filed: Nov. 10, 2022

(65) Prior Publication Data
US 2024/0163660 A1    May 16, 2024

(51) Int. Cl.
*H04W 12/08*    (2021.01)
*H04W 8/12*    (2009.01)
*H04W 12/02*    (2009.01)

(52) U.S. Cl.
CPC ............ *H04W 12/02* (2013.01); *H04W 8/12* (2013.01)

(58) Field of Classification Search
CPC ... H04W 12/02; H04W 12/082; H04W 12/10; H04W 8/12
(Continued)

(56) References Cited

U.S. PATENT DOCUMENTS 10,484,334 B1    11/2019 Lee et al.
10,594,734 B1    3/2020 Rappard et al.
(Continued)

FOREIGN PATENT DOCUMENTS

CN    202280032824.X    4/2025
EP       3886502 A1     9/2021
(Continued)

OTHER PUBLICATIONS

Alcala-Martin et al., "Global Mobile Network Aggregators: Taxonomy, Roaming Performance and Optimization," ACM, pp. 1-13 (2022).

(Continued)

*Primary Examiner* — Bharat Barot
(74) *Attorney, Agent, or Firm* — Jenkins, Taylor & Hunt, P.A.

(57) ABSTRACT

A method for providing a shared SEPP for roaming aggregators includes, at a shared SEPP that functions as a single point of ingress and egress between an MVNO PLMN and an MNO PLMN and between the MVNO PLMN and MNO PLMNs and external networks, receiving a first service-based interface (SBI) request message from the MVNO PLMN. The method further includes determining, by the shared SEPP, that the first SBI request message is destined for the MNO PLMN, and, in response, routing the first SBI request message to the MNO PLMN. The method further includes receiving a second SBI request message from the MVNO PLMN and determining that the second SBI request message is destined for one of the external networks, and, in response, routing the second SBI request message to the one external network. The shared SEPP may apply security measures for messages transmitted to and from the MNO PLMN and the MVNO PLMN.

20 Claims, 7 Drawing Sheets

(58) Field of Classification Search
USPC .......................................... 726/11–12, 14–15
See application file for complete search history.

(56) References Cited

U.S. PATENT DOCUMENTS

| | | | |
|---|---|---|---|
| 10,601,776 | B1 | 3/2020 | Burakovsky et al. |
| 11,792,163 | B2* | 10/2023 | Bykampadi ............ H04W 12/03 726/12 |
| 11,843,580 | B2 | 12/2023 | Rajput et al. |
| 2008/0235507 | A1 | 9/2008 | Ishikawa et al. |
| 2012/0204251 | A1 | 8/2012 | Kopti |
| 2014/0245423 | A1 | 8/2014 | Lee |
| 2019/0230556 | A1 | 7/2019 | Lee |
| 2020/0162429 | A1 | 5/2020 | Burakovsky et al. |
| 2020/0162514 | A1 | 5/2020 | Rappard et al. |
| 2020/0314672 | A1 | 10/2020 | Farooq |
| 2022/0015023 | A1 | 1/2022 | De-Gregorio-Rodriguez et al. |
| 2022/0110177 | A1* | 4/2022 | Choksi .................... H04L 12/14 |
| 2022/0124162 | A1 | 4/2022 | Zhang |
| 2022/0360561 | A1 | 11/2022 | Rajput et al. |
| 2023/0156549 | A1* | 5/2023 | Tsuda .................... H04W 36/30 455/440 |
| 2023/0269579 | A1* | 8/2023 | Ma ........................ H04W 12/03 455/411 |
| 2023/0319675 | A1* | 10/2023 | Kaur ..................... H04W 12/08 |
| 2023/0328620 | A1* | 10/2023 | Pinheiro ............... H04W 40/02 370/328 |
| 2024/0022910 | A1* | 1/2024 | Li .......................... H04W 12/08 |
| 2024/0057033 | A1 | 2/2024 | Goel |
| 2024/0073103 | A1 | 2/2024 | Arends et al. |
| 2024/0080300 | A1 | 3/2024 | Rajput et al. |
| 2024/0098490 | A1* | 3/2024 | Wu ........................ H04W 12/06 |
| 2024/0236677 | A1* | 7/2024 | Rajput .................. H04W 12/08 |

FOREIGN PATENT DOCUMENTS

| | | |
|---|---|---|
| KR | 20190088878 A | 7/2019 |
| WO | WO-2020/030275 A1 | 2/2020 |
| WO | WO-2021/047551 A1 | 3/2021 |
| WO | WO-2022/069089 A1 | 4/2022 |
| WO | WO-2022/235372 A1 | 11/2022 |
| WO | WO-2024/050010 A1 | 3/2024 |

OTHER PUBLICATIONS

"OAuth 2.0," Swagger, https://swagger.io/docs/specification/authentication/oauth2/, pp. 1-6 (2022).

"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).

"5G Interconnect Security," GSMA, Version 2.0, FS.36, pp. 1-61 (Jun. 3, 2021).

"3rd Generation Partnership Project; Technical Specification Group Core Network and Terminals; 5G System; Public Land Mobile Network (PLMN) Interconnection; Stage 3 (Release 17)", 3GPP TS 29.573, V17.2.0, pp. 1-102 (Sep. 2021).

"3rd Generation Partnership Project; Technical Specification Group Core Network and Terminals; 5G System; UE Policy Control Service; Stage 3 (Release 17)", 3GPP TS 29.525, V17.1.0, pp. 1-59 (Dec. 2020).

"3rd Generation Partnership Project; Technical Specification Group Core Network and Terminals; 5G System; Unified Data Management Services; Stage 3 (Release 17)", 3GPP TS 29.503, V17.1.0, pp. 1-381 (Dec. 2020).

"3rd Generation Partnership Project; Technical Specification Group Core Network and Terminals; 5G System; Session Management Services; Stage 3 (Release 17)", 3GPP TS 29.502, V17.0.0, pp. 1-292 (Mar. 2021).

"3rd Generation Partnership Project; Technical Specification Group Services and System Aspects; System Architecture and Procedures for 5G System (Release 17)", 3GPP TS 33.501, V17.0.0, pp. 1-253 (Dec. 2020).

"3rd Generation Partnership Project; Technical Specification Group Core Network and Terminals; Numbering, Addressing and Identification; (Release 17)", 3GPP TS 23.003, V17.0.0, pp. 1-142 (Dec. 2020).

"3rd Generation Partnership Project; Technical Specification Group Core Network and Terminals; 5G System; Network Function Repository Services; Stage 3 (Release 17)", 3GPP TS 29.510, V17.0.0, pp. 1-229 (Dec. 2020).

"3rd Generation Partnership Project; Technical Specification Group Core Network and Terminals; 5G System; Principles and Guidelines for Services Definition; Stage 3 (Release 17)", 3GPP TS 29.501, V17.0.0, pp. 1-78 (Dec. 2020).

"3rd Generation Partnership Project; Technical Specification Group Core Network and Terminals; 5G System; Technical Realization of Service Based Architecture; Stage 3 (Release 17)", 3GPP TS 29.500, V17.1.0, pp. 1-90 (Dec. 2020).

"3rd Generation Partnership Project; Technical Specification Group Services and System Aspects; Procedures for the 5G System (5GS); Stage 2 (Release 17)", 3GPP TS 23.502, V17.0.0, pp. 1-646 (Mar. 2021).

"3rd Generation Partnership Project; Technical Specification Group Services and System Aspects; System Architecture for the 5G System (5GS); Stage 2 (Release 17)", 3GPP TS 23.501, V17.0.0, pp. 1-489 (Mar. 2021).

Non-Final Office Action for U.S. Appl. No. 17/308,018 (Jan. 20, 2023).

Commonly-Assigned, Co-pending U.S. Appl. No. 17/902,531 for "Methods, Systems, and Computer Readable Media for Automatic Category 1 Message Filtering Rules Configuration by Learning Topology Information from Network Function (NF) Repository Function (NRF)," (Unpublished, filed Sep. 2, 2022).

Notification of Transmittal of the International Search Report and the Written Opinion of the International Searching Authority, or the Declaration for International Application No. PCT/US2022/023812 (Jul. 22, 2022).

"OAuth 2.0," Swagger, pp. 1-6 (2022).

"3rd Generation Partnership Project; Technical Specification Group Services and System Aspects; System architecture for the 5G System (5GS); Stage 2 (Release 17)," 3GPP TS 23.501, V17.5.0, pp. 1-568 (Jun. 2022).

"3rd Generation Partnership Project; Technical Specification Group Services and System Aspects; Procedures for the 5G System (5GS); Stage 2 (Release 17)," 3GPP TS 23.502, V17.4.0, pp. 1-738 (Mar. 2022).

"3rd Generation Partnership Project; Technical Specification Group Core Network and Terminals; 5G System; Public Land Mobile Network (PLMN) Interconnection; Stage 3 (Release 17)," 3GPP TS 29.573, V17.4.0, pp. 1-106 (Mar. 2022).

"5G Interconnect Security," GSMA, Version 2.0, pp. 1-61 (Jun. 3, 2021).

Commonly-Assigned, Co-pending U.S. Appl. No. 17/308,018 for "Methods, Systems, and Computer Readable Media for Platform Firewall Management by Network Function (NF) Repository Function (NRF) or Service Communications Proxy (SCP)," (Filed May 4, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"Functionality to be Deployed in Different Locations," Ericsson, https://www.ericsson.com/en/future-technologies/architecture/network-architecture-domains, pp. 1-20 (2021).

"3rd Generation Partnership Project; Technical Specification Group Services and System Aspects; Security Aspects; Study on security aspects of the 5G Service Based Architecture (SBA) (Release 16)," 3GPP TR 33.855, V16.1.0, pp. 1-103 (Sep. 2020).

Dredge, "The Service Communication Proxy: 5G Caught Up in a Service Mesh," Metaswitch, pp. 1-10 (Feb. 14, 2020).

Girondi, "Efficient Traffic Monitoring in 5G Core Network," KTH Royal Institute of Technology, pp. 1-118 (2020).

"Ultra Cloud Core 5G Policy Control Function, Release 2020.03—Configuration and Administration Guide," Cisco, https://www.cisco.

(56) References Cited

OTHER PUBLICATIONS com/c/en/us/td/docs/wireless/ucc/pcf/2020-03-0/b_ucc-5g-pcf-config-and-admin-guide_2020-03/m_5g-pcf-overview.html#id_121328, pp. 1-7 (Mar. 2020).
Salva-Garcia et al., "5G Nb-IoT: Efficient Network Traffic Filtering for Multitenant IoT Cellular Network," Security and Communications Networks, vol. 2018, pp. 1-22 (2018).
"Making 5G a Reality," NEC Corporation, pp. 1-32 (2018).
International Search Report and Written Opinion for Appl No. PCT/US2023/031707 dated Dec. 14, 2023.
Decision to Grant for European Patent Application Serial No. 22723259.2 (Jan. 7, 2025).
Non-Final Office Action for U.S. Appl. No. 17/902,531 (Dec. 17, 2024).
3GPP TSG-SA WG2 Meeting #128 Bis S2-187949 (Aug. 24, 2018).
Office Action for Chinese Patent Application Serial No. 202280032824.X (Sep. 1, 2024).
Intent to Grant for European Patent Application Serial No. 22723259.2 (Aug. 26, 2024).
Notice of Publication for European Patent Application Serial No. 22723259.2 (Feb. 14, 2024).
Notice of Allowance and Fee(s) Due for U.S. Appl. No. 17/308,018 (Aug. 2, 2023).
Notification to Grant for Chinese Patent Application Serial No. 202280032824.X (Mar. 4, 2025).

* cited by examiner

… (1) …

METHODS, SYSTEMS, AND COMPUTER READABLE MEDIA FOR PROVIDING SHARED SECURITY EDGE PROTECTION PROXY (SEPP) FOR ROAMING AGGREGATORS

TECHNICAL FIELD

The subject matter described herein relates to routing messages between public land mobile networks (PLMNs). More particularly, the subject matter described herein relates to providing a shared SEPP for roaming aggregators.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G and other types of networks is that network operators that operate as roaming aggregators use one SEPP for routing between trusted networks and a separate SEPP for routing between trusted networks and entrusted networks. A roaming aggregator, also referred to as a mobile network aggregator, is an entity that offers mobile communications services to end users by aggregating the mobile networks of multiple mobile network operators, which own the underlying physical networks. Examples of roaming network aggregators include Google Fi, Twilio, and Truphone. Examples of mobile network operators that own the underlying network resources are AT&T, Verizon, and T-Mobile. A mobile network operator may also function as a roaming aggregator by offering cellular services using its own core PLMN and another PLMN leased by a mobile virtual network operator (MVNO). An MVNO is an entity that offers communications services using the network of a single mobile network operator. A roaming aggregator that provides services using its own core PLMN and another of its PLMNs used by an MVNO is referred to as a single aggregator.

Requiring separate SEPPs to route messages between trusted networks and between trusted networks and untrusted networks increases the expense of operating a network. It would be desirable to find a mechanism to eliminate the need for multiple SEPPs in networks with MVNOs. However, 3GPP standards do not define a shared SEPP or how a shared SEPP would operate in a network that includes an MVNO.

Accordingly, there exists a need for improved methods, systems, and computer readable media for securing networks and routing messages between networks involving a roaming aggregator.

SUMMARY

A method for providing a shared security edge protection proxy (SEPP) for roaming aggregators, includes, at a shared SEPP that functions as a single point of ingress and egress between a mobile virtual network operator (MVNO) public land mobile network (PLMN) and a mobile network operator (MNO) PLMN and between the MVNO PLMN and MNO PLMNs and external networks, receiving a first service-based interface (SBI) request message from the MVNO PLMN. The method further includes determining, by the shared SEPP, that the first SBI request message is destined for the MNO PLMN, and, in response, routing the first SBI request message to the MNO PLMN. The method further includes receiving, at the shared SEPP, a second SBI request message from the MVNO PLMN. The method further includes determining, by the shared SEPP, that the second SBI request message is destined for one of the external networks, and, in response, routing the second SBI request message to the one external network.

According to another aspect of the subject matter described herein, the method for providing a shared SEPP includes maintaining a trusted PLMN ID list including PLMN IDs of trusted PLMNs of operators of the MVNO PLMN and the MNO PLMN.

According to another aspect of the subject matter described herein, determining that the first SBI request is intended for the MNO network protected by the shared SEPP includes reading a PLMN ID from the first SBI request, performing a lookup for the PLMN ID in the trusted PLMN ID list and locating the PLMN ID in the trusted PLMN ID list.

According to another aspect of the subject matter described herein, reading the PLMN ID from the first SBI request includes reading the PLMN ID from a 3gpp-Sbi-Target-Apiroot header of the first SBI request.

According to another aspect of the subject matter described herein, determining that the second SBI request is intended for the one of the external networks includes reading a PLMN ID from the second SBI request, performing a lookup for the PLMN ID in the trusted PLMN ID list and failing to locate the PLMN ID in the trusted PLMN ID list.

According to another aspect of the subject matter described herein, reading the PLMN ID from the second SBI request includes reading the PLMN ID from a 3gpp-Sbi-Target-Apiroot header of the second SBI request.

According to another aspect of the subject matter described herein, the method for providing a shared SEPP includes applying a security measure to the first and second SBI request messages.

According to another aspect of the subject matter described herein, the security measure comprises network topology hiding.

According to another aspect of the subject matter described herein, the method for providing the shared SEPP for roaming aggregators includes performing firewall filtering for messages transmitted between the MVNO PLMN and the MNO PLMN and between the MVNO PLMN and the MNO PLMNs and the external networks.

According to another aspect of the subject matter described herein, performing the firewall filtering comprises performing Category 1 and Category 2 message filtering.

According to another aspect of the subject matter described herein, a system includes a shared SEPP that functions as a single point of ingress and egress between a mobile virtual network operator (MVNO) public land mobile network (PLMN) and a mobile network operator (MNO) PLMN and between the MVNO PLMN and MNO PLMNs and external networks, the shared SEPP Including at least one processor and a memory. The system further includes an inter-PLMN routing/security manager implemented by the at least one processor for receiving a first service-based interface (SBI) request message from the MVNO PLMN, determining that the first SBI request message is destined for the MNO PLMN, and, in response, routing the first SBI request message to the MNO PLMN, receiving a second SBI request message from the MVNO PLMN, and determining that the second SBI request message is destined for one of the external networks, and, in response, routing the second SBI request message to the one external network.

According to another aspect of the subject matter described herein, the memory includes a trusted PLMN ID list including PLMN IDs of trusted PLMNs of operators of the MVNO PLMN and the MNO PLMN.

According to another aspect of the subject matter described herein, the inter-PLMN routing/security manager is configured to determine that the first SBI request is intended for the MNO network protected by the shared SEPP by reading a PLMN ID from the first SBI request, performing a lookup for the PLMN ID in the trusted PLMN ID list and locating the PLMN ID in the trusted PLMN ID list.

According to another aspect of the subject matter described herein, the inter-PLMN routing/security manager is configured to read the PLMN ID from a 3gpp-Sbi-Target-Apiroot header of the first SBI request.

According to another aspect of the subject matter described herein, the inter-PLMN routing/security manager is configured to determine that the second SBI request is intended for the one of the external networks by reading a PLMN ID from the second SBI request, performing a lookup for the PLMN ID in the trusted PLMN ID list and failing to locate the PLMN ID in the trusted PLMN ID list.

According to another aspect of the subject matter described herein, the inter-PLMN routing/security manager is configured to read the PLMN ID from a 3gpp-Sbi-Target-Apiroot header of the second SBI request.

According to another aspect of the subject matter described herein, the inter-PLMN routing/security manager is configured to apply network topology hiding to the first and second SBI request messages.

According to another aspect of the subject matter described herein, the inter-PLMN routing/security manager is configured to perform firewall filtering for messages transmitted between the MVNO PLMN and the MNO PLMN and between the MVNO PLMN and the MNO PLMNs and the external networks.

According to another aspect of the subject matter described herein, the inter-PLMN routing/security manager is configured to perform Category 1 and Category 2 message filtering.

According to another aspect of the subject matter described herein, a non-transitory computer readable medium having stored thereon executable instructions that when executed by a processor of a computer control the computer to perform steps. The steps are performed at a shared security edge protection proxy (SEPP) that functions as a single point of ingress and egress between a mobile virtual network operator (MVNO) public land mobile network (PLMN) and a mobile network operator (MNO) PLMN and between the MVNO PLMN and MNO PLMNs and external networks. The steps include receiving a first service-based interface (SBI) request message from the MVNO PLMN. The steps further include determining, by the shared SEPP, that the first SBI request message is destined for the MNO PLMN, and, in response, routing the first SBI request message to the MNO PLMN. The steps further include receiving a second SBI request message from the MVNO PLMN. The steps further include determining, by the shared SEPP, that the second SBI request message is destined for one of the external networks, and, in response, routing the second SBI request message to the one external network.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
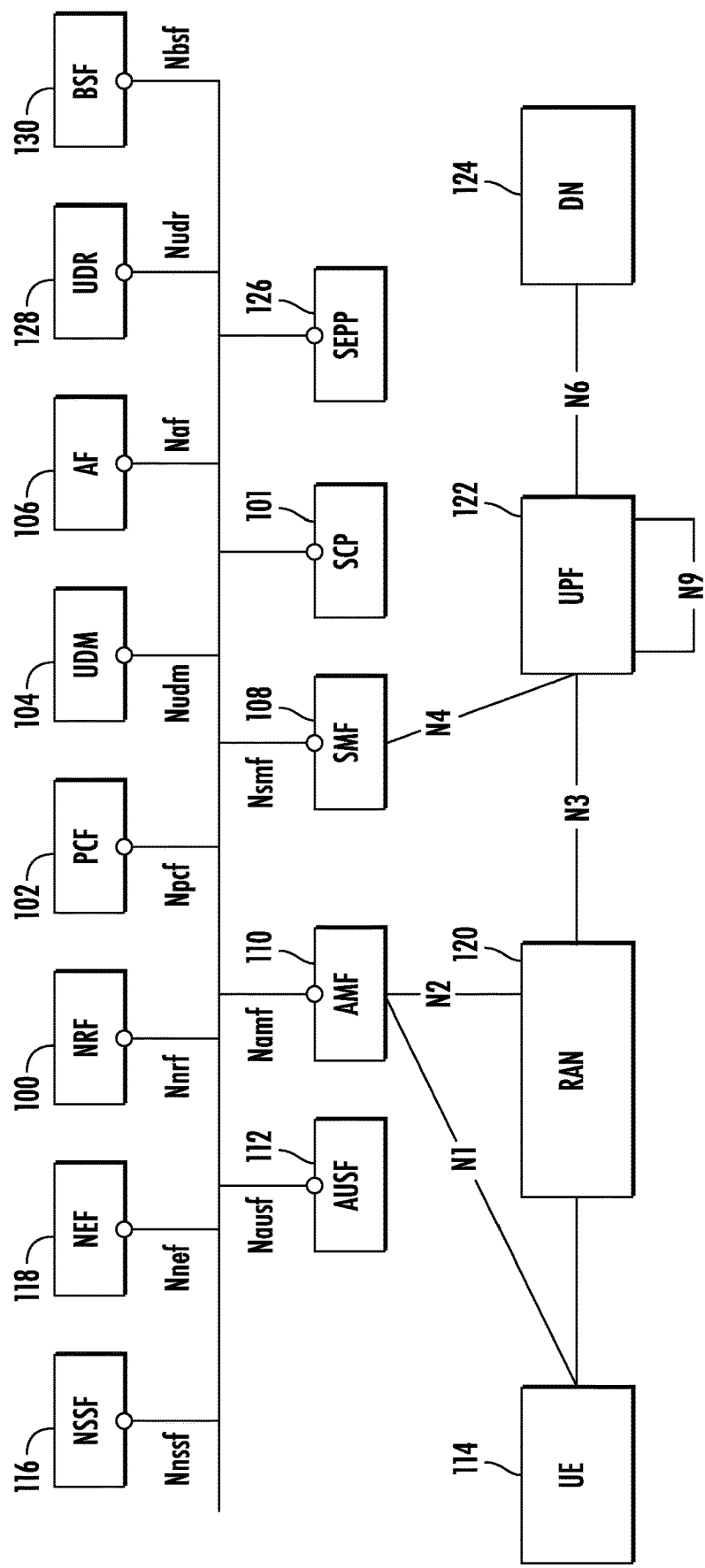
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIAvailability service, which enables NFs to update and subscribe to receive notification of updates in network slice selection assistance information (NSSAI) availability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

Figure 2:
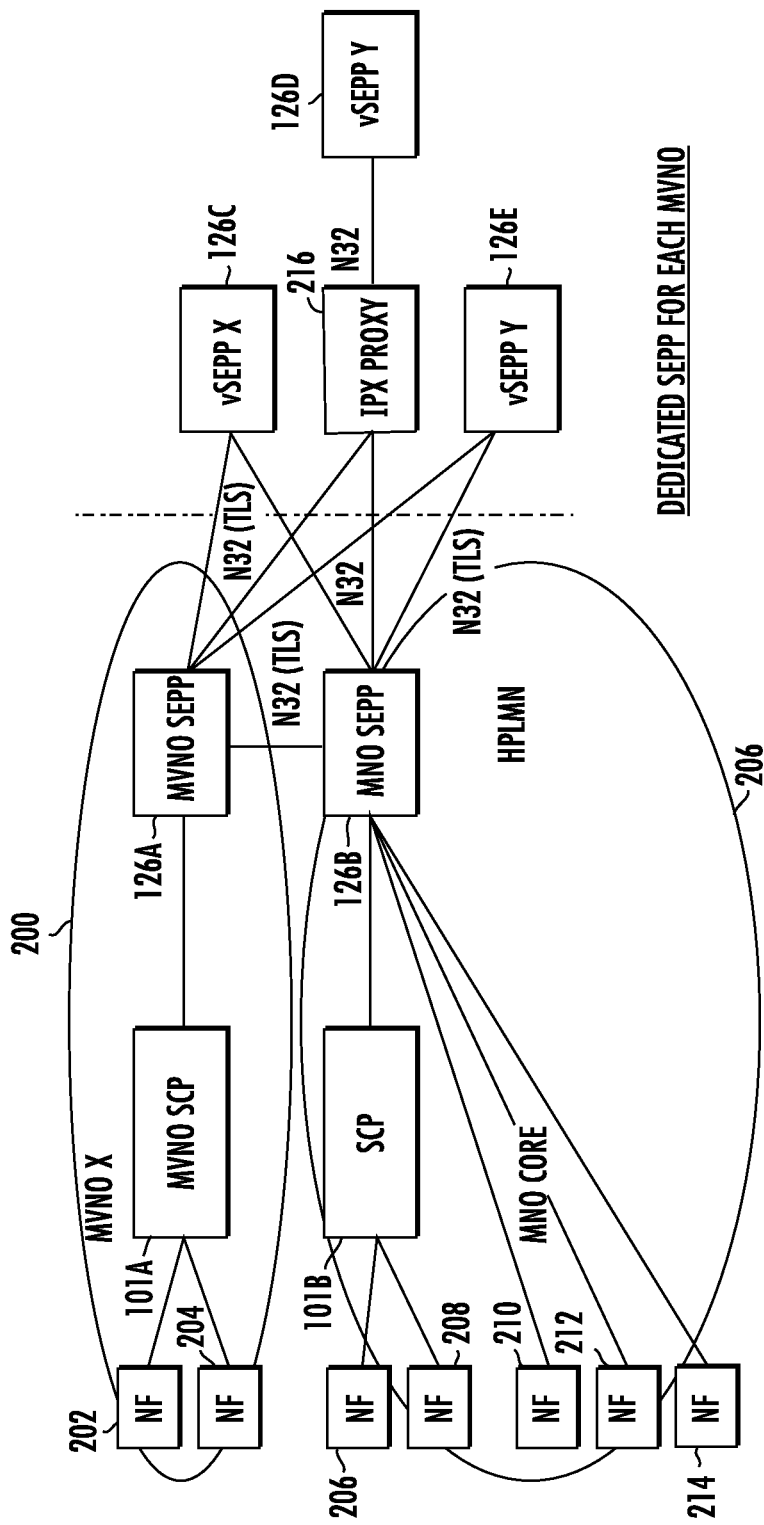
FIG. 2 is a network diagram illustrating a network used by a roaming aggregator, external networks, and the use of separate SEPPs to route messages between different ones of the networks.

As stated above, one problem in 5G networks is that networks used by roaming aggregators require separate SEPPs to route messages between trusted networks and between trusted networks and external or untrusted networks. FIG. 2 is a network diagram illustrating a network used by a roaming aggregator, external networks, and the use of separate SEPPs to route messages between different ones of the networks. Referring to FIG. 2, a mobile virtual network operator MVNO X provides service using PLMN A 200. PLMN A 200 includes NFs 202 and 204, which may be AMFs or any other network function, an MVNO SCP 101A and an MVNO SEPP 126A.

A mobile network operator provides service using PLMN B 206. PLMN B 206 includes NFs 208, 210, 212, 214, and 216, an SCP 101B, and an MNO SEPP 126B. In the network architecture illustrated in FIG. 2, it is assumed that the mobile network operator of PLMN B 206 trusts the mobile network operator of PLMN A 200. External networks may be protected by SEPPs 126C, 126D, and 126E. The external networks protected by SEPPs 126C, 126D, and 126E are assumed to be untrusted by the mobile network operator of PLMN B 206 and the mobile virtual network operator of PLMN A 200. An IP exchange (IPX) provider proxy 218 may facilitate communications among SEPPs 126A-126E.

In the architecture illustrated in FIG. 2, a dedicated SEPP is required for each MVNO. Although only one MVNO is illustrated in FIG. 2, multiple MVNOs could be present, each requiring its own SEPP to route messages to external networks and to the MNO's network. The MNO is also required to have an SEPP to route messages to and from the MVNO network and external network. Requiring an MNO SEPP and an MVNO SEPP for each combination of an MNO and MVNO network is undesirable, as SEPP resources are unnecessarily duplicated, and an N32 connection is required between the MNO network and the MVNO network.

Figure 3:
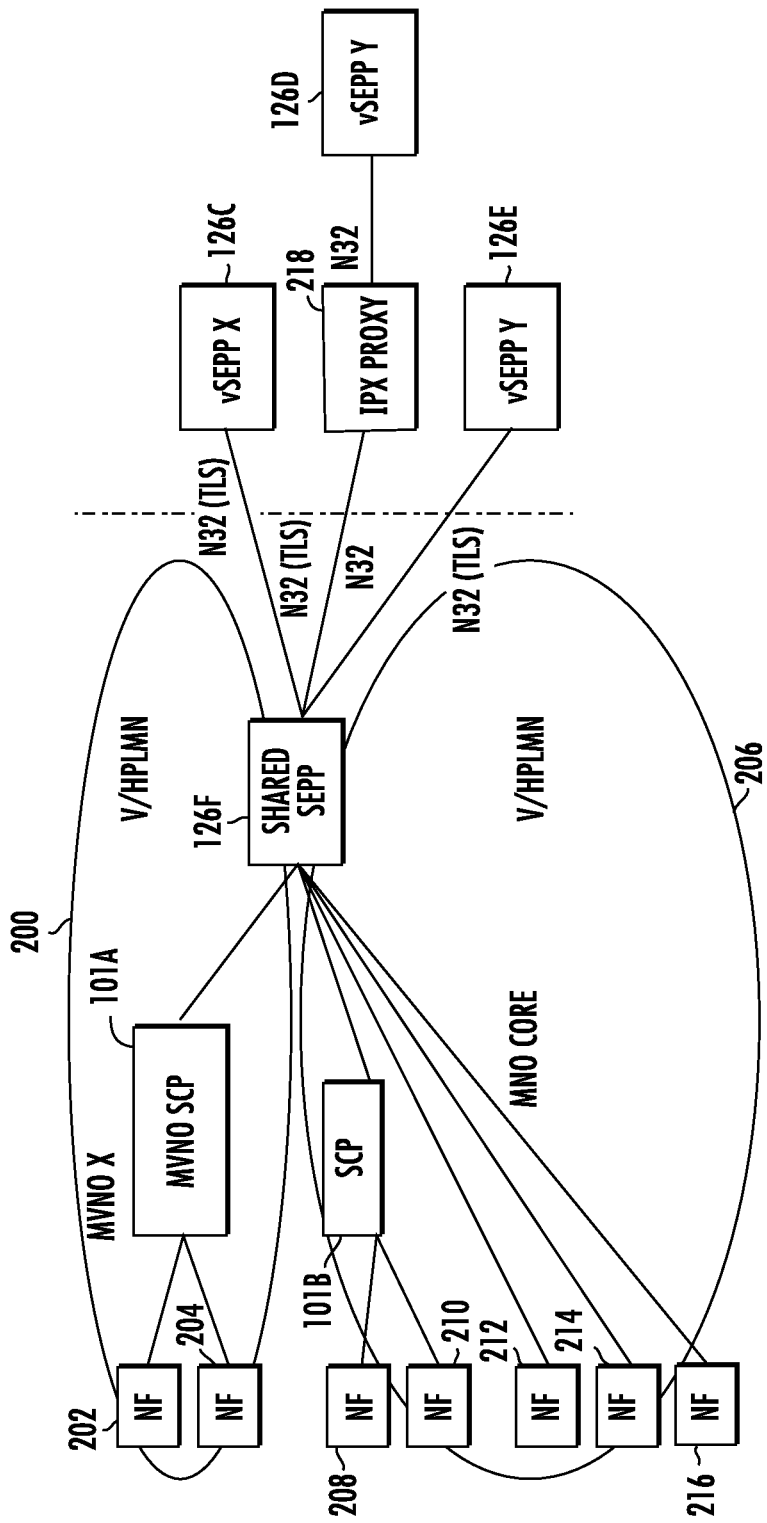
FIG. 3 is a network diagram illustrating a network operated by a roaming aggregator, external networks, and the use of a shared SEPP to route messages between different ones of the networks.

It may be desirable to collapse the functionality of the MNO SEPP and the MVNO SEPP into a single SEPP that is shared by the MNO network and the MVNO network. FIG. 3 is a network diagram illustrating a PLMN operated by an MVNO, a network operated by an MNO, external networks, and the use of a shared SEPP to route messages between different ones of the networks. Referring to FIG. 3, the functionalities of MVNO SEPP 126A and MNO SEPP 126B are collapsed into shared SEPP 126F. In addition, shared SEPP 126F is capable of intelligently routing messages between PLMNs 200 and 206 and between PLMNs 200 and 206 and the PLMNs protected by SEPPs 126C, 126D, and 126E. Shared SEPP 126F may also perform security operations for messages between PLMNs 200 and 206 and for messages transmitted between PLMNs 200 and 206 and the PLMNs protected by SEPPs 126C, 126D, and 126E. If a message originates from PLMN 200 and is destined for PLMN 206, shared SEPP 126F may route the message directly to PLMN 206. An N32 connection between PLMNs 200 and 206 is avoided because PLMNs 200 and 206 share an SEPP. For messages originating from PLMN 200 or 206 and destined for one of PLMNs protected by SEPPs 126C, 126D, or 126E, shared SEPP 126F may forward the messages over the N32 connection with the SEPP associated with the destination network.

In order to evaluate whether a message should be routed between PLMNs 200 and 206 or to an external PLMN, SEPP 126F may maintain a trusted PLMN ID list that contains the PLMN IDs of trusted PLMNs. If SEPP 126F receives a message originating from one of PLMNs 200 or 206, shared SEPP 126F may perform a lookup in the trusted PLMN ID list to determine whether the destination PLMN for the message is in the list. If the destination PLMN ID is in the list, shared SEPP 126F may route the message to the trusted PLMN, which in FIG. 3 is either PLMN A 200 or PLMN B 206. Table 1 shown below illustrates an example of a PLMN ID list that may be maintained by shared SEPP 126F.

TABLE 1

| Trusted PLMN ID List |
| --- |
| TRUSTED PLMN IDs |
| PLMN A |
| PLMN B |

In Table 1, the trusted PLMNs include PLMN A 200 and PLMN B 206 shown in FIG. 3. If shared SEPP 126F determines that the PLMN ID in the received message is not in the trusted PLMN ID list, shared SEPP 126F may route the message over the N32 connection associated with the destination PLMN. The destination PLMN ID of a message may be obtained from the 3gpp-Sbi-Target-Apiroot header of the message.

In the architecture illustrated in FIG. 3, shared SEPP 126F is shared between an MNO PLMN and a single MVNO PLMN. It is understood that shared SEPP 126F may be shared between an MNO PLMN and more than one MVNO PLMN without departing from the scope of the subject matter described herein. In such a case, the trusted PLMN list maintained by shared SEPP 126F may contain the PLMN IDs of the MNO PLMN and each of the MVNO PLMNs, assuming that the operators of the different MVNO PLMNs trust each other. Alternatively, shared SEPP 126F could contain separate trusted PLMN ID lists for each MVNO PLMN with the PLMN IDs of the PLMNs trusted by the operator of each MVNO PLMN. Shared SEPP 126B may also be configured with separate security rules for each MVNO PLMN.

Figure 4:
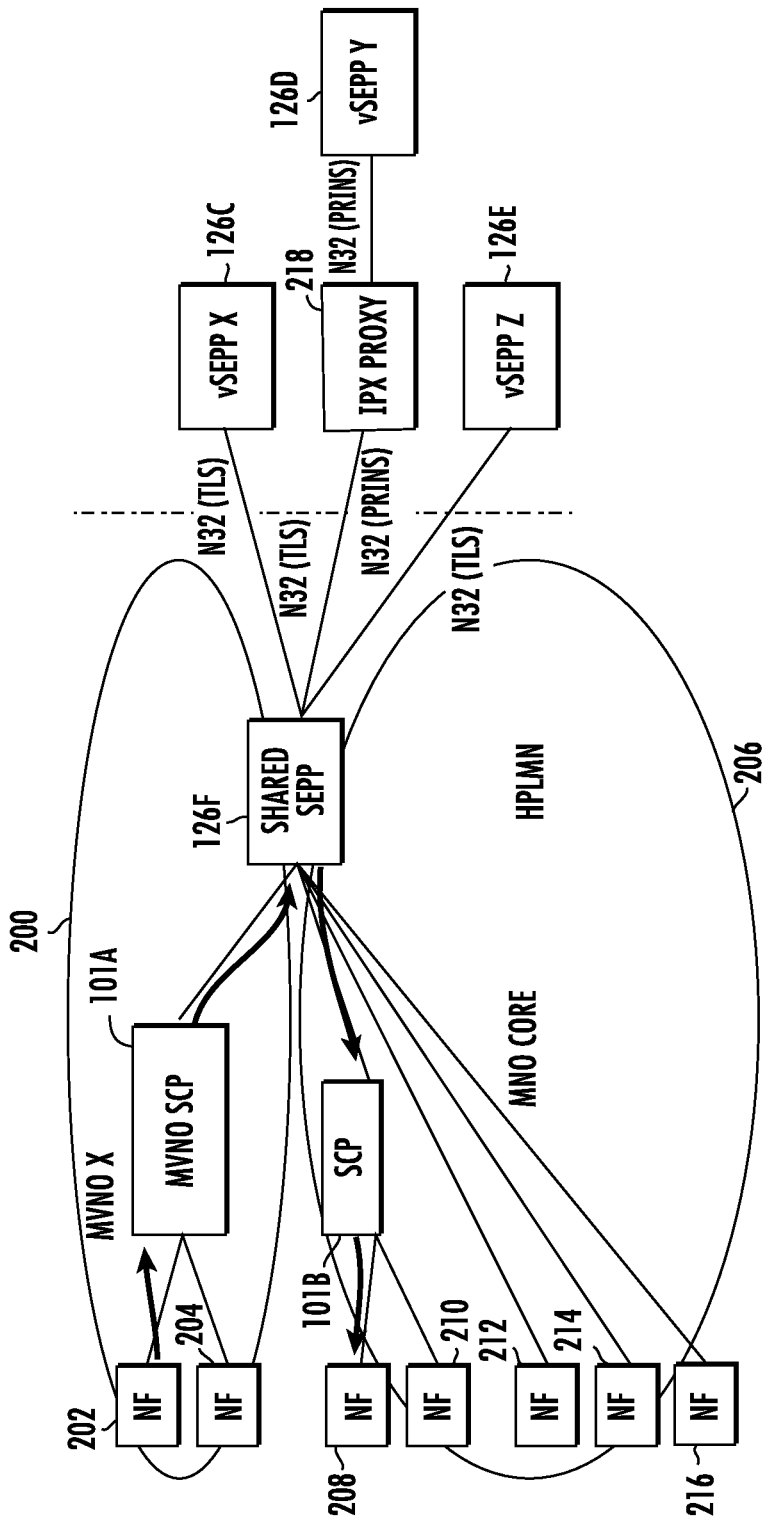
FIG. 4 is a network diagram illustrating the routing path for messages routed between trusted networks of the mobile network operator that functions as a roaming aggregator.

FIG. 4 is a network diagram illustrating the routing path for messages routed between trusted networks of the mobile network operator that functions as a roaming aggregator. Referring to FIG. 4, NF 202 in PLMN 200 originates an SBI request message destined for NF 208 in PLMN 206. NF 202 forwards the message to MVNO SCP 101A. MVNO SCP 101A determines that the message is intended for another PLMN and forwards the message to shared SEPP 126F. Shared SEPP 126F receives the message and reads the target PLMN ID from the 3gpp-Sbi-Target-Apiroot header of the message. Shared SEPP 126F determines that the message is destined for PLMN 206. Accordingly, shared SEPP 126F forwards the message to SCP 101B in PLMN B 206. SCP 101B identifies NF 208 as the destination for the message and forwards the message to NF 208. Thus, FIG. 4 illustrates the case of routing between trusted networks of a mobile network operator using a shared SEPP.

Figure 5:
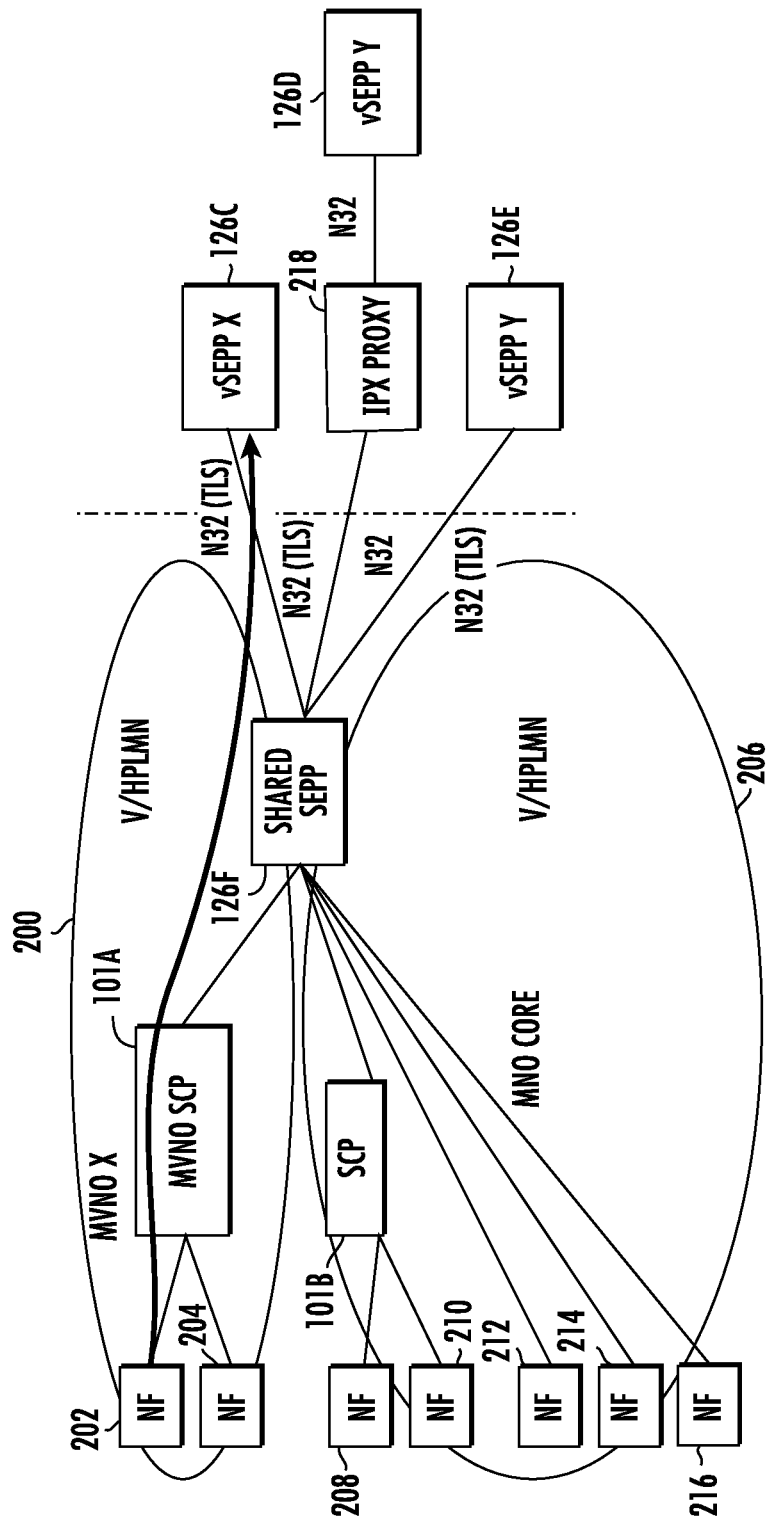
FIG. 5 is a network diagram illustrating the routing path for messages routed between a trusted network of the mobile network operator that functions as a roaming aggregator and an external network.

FIG. 5 is a network diagram illustrating the routing path for messages routed between a trusted network of the mobile network operator that functions as a roaming aggregator and an external network. Referring to FIG. 5, NF 202 in PLMN 200 originates an SBI request message destined for an NF a PLMN protected by SEPP 126C. NF 202 forwards the message to MVNO SCP 101A. MVNO SCP 101A determines that the message is intended for another PLMN and forwards the message to shared SEPP 126F. Shared SEPP 126F receives the message and reads the target PLMN ID from the 3gpp-Sbi-Target-Apiroot header of the message. Shared SEPP 126F determines that the destination PLMN is not in the trusted PLMN ID list and that the message is destined for a PLMN protected by SEPP 126C. Accordingly, shared SEPP 126F applies security mechanisms, such as network topology hiding, and forwards the message to SEPP 126C. Thus, FIG. 5 illustrates the case of routing from a trusted network to an untrusted network using a shared SEPP.

Figure 6:
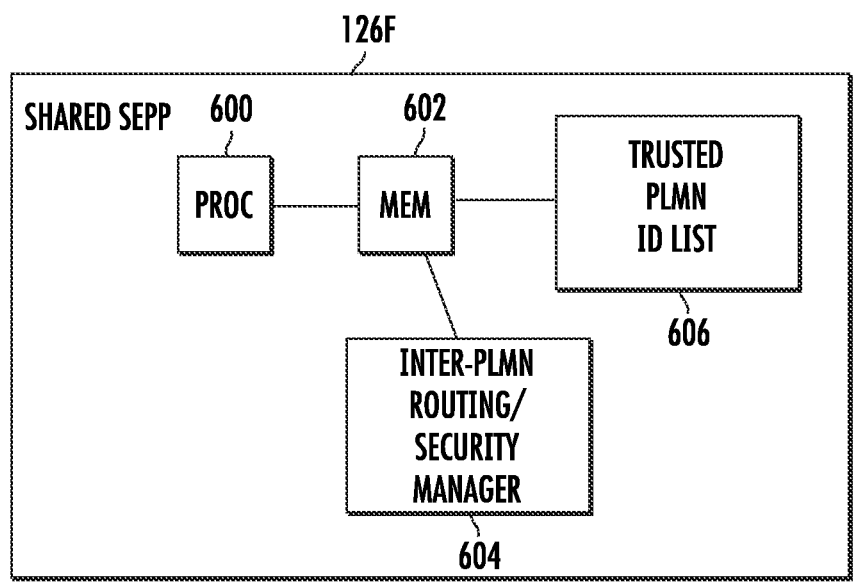
FIG. 6 is a block diagram illustrating an exemplary architecture for a shared SEPP that routes messages between trusted networks of a mobile network operator that functions as a roaming aggregator and between the trusted networks and external networks.

FIG. 6 is a block diagram illustrating an exemplary architecture for a shared SEPP that routes messages between trusted networks of a mobile network operator that functions as a roaming aggregator and between the trusted networks and external networks. Referring to FIG. 6, shared SEPP 126F includes at least one processor 600 and a memory 602. Shared SEPP 126F further includes an inter-PLMN routing/security manager 604 that performs inter-PLMN routing of SBI request messages and applies security measures to messages entering and leaving the MNO and MVNO PLMNs. Shared SEPP 126F further includes a trusted PLMN ID list 606 stored in memory 602. Trusted PLMN ID list 606 may include a list of PLMN IDs of PLMNs that are trusted by operators of the MNO PLMN and the MVNO PLMN.

Inter-PLMN routing/security manager 604 may be implemented using computer executable instructions stored in memory 602 and executed by processor 600.

Inter-PLMN routing/security manager 604 may perform network topology hiding by removing or encrypting source network identifying information, including but not limited to source PLMN ID, source IP address, etc. from SBI request messages transmitted to another PLMN. As another example of a security procedure that may be implemented by inter-PLMN routing/security manager 604, inter-PLMN routing/security manager 604 may perform firewall filtering for messages incoming to PLMNs 200 and 206—both from networks external to PLMNs 200 and 206 and between PLMNs 200 and 206. For example, if inter-PLMN routing/security manager 604 receives a message relating to roaming that concerns a device that should not be roaming (such as a stationary device), inter-PLMN routing/security manager 604 may block or discard the message.

In another example, inter-PLMN routing/security manager 604 may perform Category 1 and Category 2 message filtering as defined in CSMA FS.36, 5G Interconnect Security Version 2.0. For example Section 3.4.5 of FS36 suggests Category 1 message filtering on resource URI and HTTP method of custom operation screening within an N32fReformattedReqMsg and N32fRefirnatttedRespMsg to secure the 5GC network. FS.36 defines Category 1 message filtering as unauthorized packet filtering at the interface level (see Section 3.4.3). The purpose of Category 1 message filtering is to prevent unauthorized external access to internal interfaces. Even though there is no N32 interface between MVNO PLMN 200 and MNO PLMN 206, inter-PLMN routing/security manager 604 may perform Category 1 message filtering on HTTP methods and resource URIs of messages transmitted between MVNO PLMN 200 and MNO PLMN 206.

Category 2 message filtering is defined as home network packet filtering by examining packet content, such as the subscription permanent identifier (SUR), subscription concealed identifier (SUCI), international mobile subscriber identifier (USD and mobile subscriber integrated services digital network (MSISDN) number. Category 2 message filtering checks for a type of 5G interconnect message from the home network or allocated network of a subscriber. To perform Category 2 message filtering, shared SEPP 12F may be configured with rules used by inter-PLMN routing/security manager 604 to check messages entering MVNO PLMN 200 and MNO PLMN 206 to determine, for example, whether the messages are of allowed message types to access information for a particular subscriber identified by one or more of the above-listed parameters.

Figure 7:
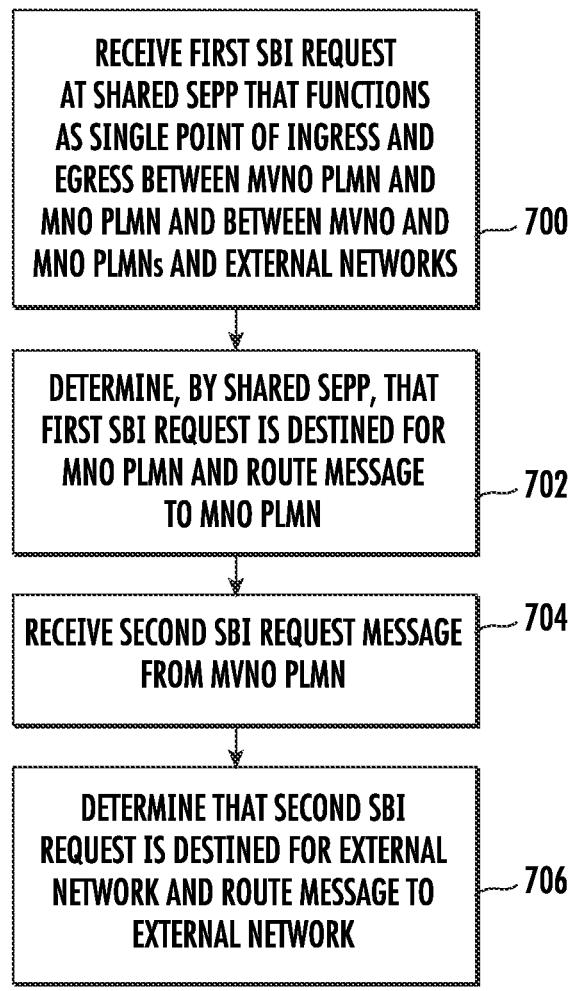
FIG. 7 is a message flow diagram illustrating an exemplary process for providing a shared SEPP for roaming aggregators.

FIG. 7 is a message flow diagram illustrating an exemplary process for providing a shared SEPP for roaming aggregators. Referring to FIG. 7, in step 700, the process includes, at a shared SEPP that functions as a single point of ingress and egress between a mobile virtual network operator (MVNO) public land mobile network (PLMN) and a mobile network operator (MNO) PLMN and between the MVNO PLMN and MNO PLMNs and external networks, receiving a first service-based interface (SBI) request message from the MVNO PLMN. For example, shared SEPP 126F may be configured to operate to route messages between a MVNO PLMN, such as PLMN 200 and an MNO PLMN, such as PLMN 206. In step 700, the shared SEPP receives an SBI request from one of the NFs in MVNO PLMN 200.

In step 702, the process includes determining, by the shared SEPP, that the first SBI request message is destined for the MNO PLMN, and, in response, routing the first SBI request message to the MNO PLMN. To make this determination, shared SEPP 126F may read the PLMN ID from the 3gpp-Sbi-Target-Apiroot header of the message and perform a lookup in the trusted PLMN ID list. In this example, shared SEPP 126F locates the PLMN ID in the trusted PLMN ID list and routes the message to the MNO PLMN.

In step 704, the process further includes receiving, at the shared SEPP, a second SBI request message from the MVNO PLMN. In this step, shared SEPP 126F receives another SBI request from an NF in MVNO PLMN 200.

In step 706, the process further includes determining, by the shared SEPP, that the second SBI request message is destined for one of the external networks, and, in response, routing the second SBI request message to the one external network. To make this determination, shared SEPP 126F may read the PLMN ID from the 3gpp-Sbi-Target-Apiroot header of the message and perform a lookup in the trusted PLMN ID list. In this example, shared SEPP 126F does not locate the PLMN ID in the trusted PLMN ID list and, as a result, routes the message to a network external to the MVNO and MNO PLMNs.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 17) 3GPP TS 29.510 V17.6.0 (2022-06)
2. 5G Interconnect Security, Version 2.0 GSMA FS.36 (3 Jun. 2021)
3. OAuth2.0; https://swaggerioldocs/specificationlauthenticationioauth2/(2022).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing a shared security edge protection proxy (SEPP) for roaming aggregators, the method comprising:
  at a shared SEPP:
    operating as a single point of ingress and egress between a mobile virtual network operator (MVNO) public land mobile network (PLMN) and a mobile network operator (MNO) PLMN and between the MVNO PLMN and MNO PLMNs and external networks, wherein operating as the single point of ingress and egress includes, for egress messages from the MVNO PLMN and the MNO PLMN, providing an exclusive egress interface from the MVNO PLMN and the MNO PLMN to the external networks and, for ingress messages from the external networks, providing an exclusive ingress interface to the MVNO PLMN and the MNO PLMN for messages from the external networks;
    receiving a first service-based interface (SBI) request message from the MVNO PLMN;
    determining, by the shared SEPP, that the first SBI request message is destined for the MNO PLMN, and, in response, routing the first SBI request message to the MNO PLMN;
    receiving a second SBI request message from the MVNO PLMN; and determining, by the shared SEPP, that the second SBI request message is destined for one of the external networks, and, in response, routing the second SBI request message to the one external network.

2. The method of claim 1 comprising, at the shared SEPP, maintaining a trusted PLMN ID list including PLMN IDs of trusted PLMNs of operators of the MVNO PLMN and the MNO PLMN.

3. The method of claim 2 wherein determining that the first SBI request is intended for the MNO network protected by the shared SEPP includes reading a PLMN ID from the first SBI request, performing a lookup for the PLMN ID in the trusted PLMN ID list and locating the PLMN ID in the trusted PLMN ID list.

4. The method of claim 3 wherein reading the PLMN ID from the first SBI request includes reading the PLMN ID from a 3gpp-Sbi-Target-Apiroot header of the first SBI request.

5. The method of claim 2 wherein determining that the second SBI request is intended for the one of the external networks includes reading a PLMN ID from the second SBI request, performing a lookup for the PLMN ID in the trusted PLMN ID list and failing to locate the PLMN ID in the trusted PLMN ID list.

6. The method of claim 5 wherein reading the PLMN ID from the second SBI request includes reading the PLMN ID from a 3gpp-Sbi-Target-Apiroot header of the second SBI request.

7. The method of claim 1 comprising applying a security measure to the first and second SBI request messages.

8. The method of claim 7 wherein the security measure comprises network topology hiding.

9. The method of claim 1 comprising performing firewall filtering for messages transmitted between the MVNO PLMN and the MNO PLMN and between the MVNO PLMN and the MNO PLMNs and the external networks.

10. The method of claim 9 wherein performing the firewall filtering comprises performing Category 1 and Category 2 message filtering.

11. A system for providing a shared security edge protection proxy (SEPP) for roaming aggregators, the system comprising:
a shared SEPP that operates as a single point of ingress and egress between a mobile virtual network operator (MVNO) public land mobile network (PLMN) and a mobile network operator (MNO) PLMN and between the MVNO PLMN and MNO PLMNs and external networks, the shared SEPP Including at least one processor and a memory, wherein operating as the single point of ingress and egress includes, for egress messages from the MVNO PLMN and the MNO PLMN, providing an exclusive egress interface from the MVNO PLMN and the MNO PLMN to the external networks and, for ingress messages from the external networks, providing an exclusive ingress interface to the MVNO PLMN and the MNO PLMN for messages from the external networks; and
an inter-PLMN routing/security manager implemented by the at least one processor for receiving a first service-based interface (SBI) request message from the MVNO PLMN, determining that the first SBI request message is destined for the MNO PLMN, and, in response, routing the first SBI request message to the MNO PLMN, receiving a second SBI request message from the MVNO PLMN, and determining that the second SBI request message is destined for one of the external networks, and, in response, routing the second SBI request message to the one external network.

12. The system of claim 11 wherein the memory includes a trusted PLMN ID list including PLMN IDs of trusted PLMNs of operators of the MVNO PLMN and the MNO PLMN.

13. The system of claim 12 wherein the inter-PLMN routing/security manager is configured to determine that the first SBI request is intended for the MNO network protected by the shared SEPP by reading a PLMN ID from the first SBI request, performing a lookup for the PLMN ID in the trusted PLMN ID list and locating the PLMN ID in the trusted PLMN ID list.

14. The system of claim 13 wherein the inter-PLMN routing/security manager is configured to read the PLMN ID from a 3gpp-Sbi-Target-Apiroot header of the first SBI request.

15. The system of claim 12 wherein the inter-PLMN routing/security manager is configured to determine that the second SBI request is intended for the one of the external networks by reading a PLMN ID from the second SBI request, performing a lookup for the PLMN ID in the trusted PLMN ID list and failing to locate the PLMN ID in the trusted PLMN ID list.

16. The system of claim 15 the inter-PLMN routing/security manager is configured to read the PLMN ID from a 3gpp-Sbi-Target-Apiroot header of the second SBI request.

17. The system of claim 11 wherein the inter-PLMN routing/security manager is configured to apply network topology hiding to the first and second SBI request messages.

18. The system of claim 11 wherein the inter-PLMN routing/security manager is configured to perform firewall filtering for messages transmitted between the MVNO PLMN and the MNO PLMN and between the MVNO PLMN and the MNO PLMNs and the external networks.

19. The system of claim 18 wherein the inter-PLMN routing/security manager is configured to perform Category 1 and Category 2 message filtering.

20. A non-transitory computer readable medium having stored thereon executable instructions that when executed by a processor of a computer control the computer to perform steps comprising:
at a shared security edge protection proxy (SEPP):
operating as a single point of ingress and egress between a mobile virtual network operator (MVNO) public land mobile network (PLMN) and a mobile network operator (MNO) PLMN and between the MVNO PLMN and MNO PLMNs and external networks, wherein operating as the single point of ingress and egress includes, for egress messages from the MVNO PLMN and the MNO PLMN, providing an exclusive egress interface from the MVNO PLMN and the MNO PLMN to the external networks and, for ingress messages from the external networks, providing an exclusive ingress interface to the MVNO PLMN and the MNO PLMN for messages from the external networks;
receiving a first service-based interface (SBI) request message from the MVNO PLMN;
determining, by the shared SEPP, that the first SBI request message is destined for the MNO PLMN, and, in response, routing the first SBI request message to the MNO PLMN;
receiving a second SBI request message from the MVNO PLMN; and determining, by the shared SEPP, that the second SBI request message is destined for one of the external networks, and, in response, routing the second SBI request message to the one external network.

\* \* \* \* \*